United States Patent [19]

Guarnotta

[11] Patent Number: 5,406,327
[45] Date of Patent: Apr. 11, 1995

[54] TENSIONING DEVICE FOR THE POWER-SUPPLY AND COAXIAL CABLES OF A CAMERA WHICH IS MOVED IN A VIDEO SURVEILLANCE TUNNEL

[75] Inventor: Albert Guarnotta, Brunoy, France

[73] Assignee: Dessins Et Techniques De L'Ingenierie, Athis-Mons, France

[21] Appl. No.: 154,810

[22] Filed: Nov. 18, 1993

[30] Foreign Application Priority Data

Nov. 30, 1992 [FR] France ................... 92 14363

[51] Int. Cl.6 ............................................. H04N 7/18
[52] U.S. Cl. ................................ 348/143; 191/12 R; 242/155 R
[58] Field of Search ................. 348/143–144, 348/148; 191/12 R; 242/155 R; H04N 7/18

[56] References Cited

U.S. PATENT DOCUMENTS

| | | | |
|---|---|---|---|
| 2,602,524 | 7/1952 | Shirley | 348/143 |
| 3,588,388 | 6/1971 | Harris | 191/12 R |
| 3,935,380 | 1/1976 | Coutta | 348/150 |
| 4,051,525 | 9/1977 | Kelly | 348/143 |
| 4,510,526 | 4/1985 | Coutta et al. | 348/143 |

*Primary Examiner*—Howard W. Britton
*Attorney, Agent, or Firm*—Rodgers & Rodgers

[57] ABSTRACT

Tensioning device suitable for providing an adjustable and balanced tension to the power-supply and multiplexing cable (1) and to the coaxial video transmission cable (2), these being connected up to a camera turret supported by a carriage (C) for to-and-fro translation in a video surveillance tunnel, each of these two cables (1, 2) being anchored in a fixed manner to the carriage (C), as well as to its point (P1, P2) of penetration into the tunnel, coming from outside the latter, and being rigged up over the pulley of a respective tensioning pulley block (M1, M2) before being anchored to the corresponding bracket (S1, S2) of the carriage (C), these two pulley blocks (M1, M2) being connected by a flexible cablet (3) passing over return pulleys (4, 5, 7) and a roller (6) of a tensioning device.

6 Claims, 1 Drawing Sheet

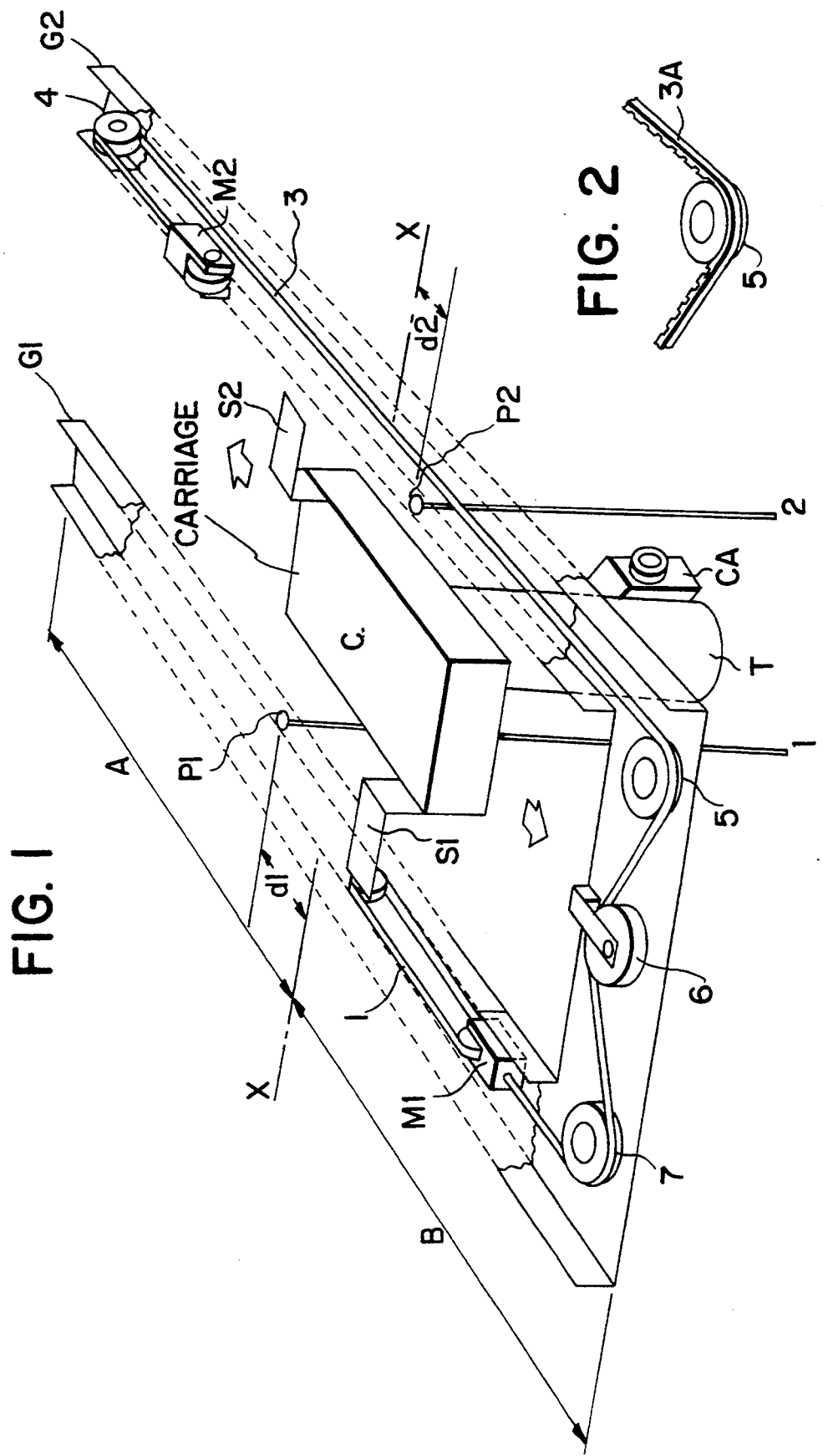

TENSIONING DEVICE FOR THE POWER-SUPPLY AND COAXIAL CABLES OF A CAMERA WHICH IS MOVED IN A VIDEO SURVEILLANCE TUNNEL

The present invention relates to a tensioning device for the power-supply cable and the coaxial cable of a camera moved in a video surveillance tunnel. More particularly, it relates to such a tensioning device suitable for providing an adjustable and balanced tension to the power-supply and multiplexing cable and to the coaxial video transmission cable, these being connected up to a camera turret supported by a carriage for to-and-fro translation in a video surveillance tunnel, each of these two cables being anchored in a fixed manner to the carriage, as well as to its point of penetration into the tunnel, coming from outside the latter.

In the current art of video surveillance tunnels, as described for example in Patent Application FR-91/08151, published on Jan. 8, 1993 under the No. 2,678,796, in the name of the applicant company, the support carriage of a turret for rotation in azimuth and in elevation, onto which a video camera is mounted, is moved translationally over a profiled guide path internal to the tunnel, by means of a device for to-and-fro translation constituted by a cablet under tension passing in the groove of a driving pulley located at one end of the tunnel and over a return pulley at the other end of the latter so as to form a closed loop, the two ends of which are secured to the carriage. This carriage drives a power-supply and multiplexing cable as well as a coaxial cable which penetrate into and are respectively attached, one at one end of the tunnel and, the other at the opposite end of the latter, each of these cables being rigged up inside the tunnel over a tensioning pulley before being anchored to the carriage, which pulley is attached to one end of an elastic cable which is anchored, at its other end, to the corresponding end of the tunnel.

This cable assembly provides an arrangement for tensioning or for returning the cable rigged up over the tensioning pulley and prevents this cable from having too great a deflection and, as a result, from remaining suspended inside the tunnel at a level above the carriage without risk of frictionally rubbing on the latter or on the inner wall of the tunnel. This design of tensioning device acting on the power-supply cable and on the coaxial cable is, overall, operationally entirely satisfactory but it proves to be the case that the elastic cable loses its elasticity relatively quickly insofar as it no longer ensures sufficient tension and therefore has to be frequently replaced.

In order to avoid this drawback brought about by the use of an elastic cable, the applicant company has designed a novel tensioning cable assembly which forms the subject of the present invention and which no longer uses two elastic cables, but a single flexible cablet having only a low elongation under its operational tension and which acts, in order to provide a balanced tension, simultaneously on the power-supply and multiplexing cable and on the coaxial cable, both being anchored to the carriage and attached at their respective points of penetration into the tunnel.

Thus, according to the invention, this tensioning device for the power-supply and multiplexing cable and the coaxial cable, both being anchored to a camera translation and support carriage in a video surveillance tunnel and being attached at their point of penetration into this tunnel, this device being noteworthy in that each of these cables is rigged up over a pulley of a movable tensioning pulley block before being anchored to the carriage, one at one end of the latter and the other at the opposite end, and in that the point of penetration into and of attachment in the tunnel of the power-supply and multiplexing cable is located in the median longitudinal part of this tunnel and on a lateral side of the latter corresponding to the side of the carriage where this cable is anchored, whereas the point of penetration and of attachment of the coaxial cable, as well as its point of anchoring to the carriage are located in the same manner, but on the other lateral side of this tunnel, the pulley block for tensioning this coaxial cable being located in order to move in one half of the length of the tunnel, whereas the pulley block for tensioning the power-supply and multiplexing cable is located in order to move in the other half of the length of the tunnel, these two tensioning pulley blocks being connected together via a flexible cablet which is permanently tensioned by means of a roller of a tensioning device.

Moreover, and in accordance with the present invention, the flexible cablet, which is to provide a balanced tension between the power-supply and multiplexing cable part and the coaxial cable part which move as a function of the position of the camera support carriage inside the tunnel, and which cablet is attached by one of its ends to one of the two pulley blocks, is cabled up from this pulley block in order to pass firstly over a first return pulley, attached to the corresponding end of the tunnel in the half of the latter in which this pulley block is to move as a result of the translational motion of the carriage over the entire length of the tunnel, then this cablet follows the entire length of the tunnel before passing over a second return pulley attached to the other end of the tunnel and, subsequently, passes over the roller of the tensioning device, then over a third return pulley, attached to this same end of the tunnel and, finally, is attached, by its other end, to the other pulley block which is located in order to move in the corresponding other half of this tunnel.

Furthermore, and in accordance with the invention, the power-supply and multiplexing cable penetrates into the median part of one of the lateral sides of the tunnel at a point located at a distance of approximately one meter from the median transverse axis of this tunnel, this distance being taken from this axis in the direction away from the position of the pulley block for tensioning this power-supply and multiplexing cable, the point of penetration of the coaxial cable being located in the same manner but on the opposite lateral side of the tunnel, that is to say at approximately one meter from the median transverse axis of the latter, but in the direction away from the position of the pulley block for tensioning this coaxial cable.

Moreover, in one embodiment in accordance with the invention, so as to avoid overtensioning the cablet connecting the pulley blocks together, as well as the power-supply and coaxial cables respectively rigged up in these pulley blocks, this overtensioning being possibly due to the dead weights of the latter and of the cables, ducts are installed laterally inside the tunnel, and over the entire length of the latter, so that they serve respectively as bearing slideways for the pulley blocks and, optionally, for the cables, these ducts being preferably provided made of plastic having a low coefficient of friction, such as PVC.

On the other hand, in another embodiment in accordance with the invention, this tensioning device may also be suitable for providing, at the same time, a device for controlling the translation of the carriage and, in order to do this, one of the three return pulleys for the flexible cablet and, preferably, the second pulley located in the vicinity of the roller of the tensioning device, instead of being a driven pulley, is rotationally controlled in order to serve as a driving pulley for driving the cablet to and fro, each of the two tensioning pulley blocks then serving respectively, one as driver or traction pulley block, and the other as driven pulley block and vice versa, interacting with each of the cables in order to move the carriage translationally in either direction. In this case, the cablet could be a cogged belt or a metal cable.

It will furthermore be noted that the flexible cablet is provided, preferably, made of nylon having a low coefficient of elongation under tension.

Other characteristics of the present invention will emerge from the following description of an embodiment of a device for tensioning the power-supply and coaxial cables of a camera inside a video surveillance tunnel, given by way of non-limiting example and represented diagrammatically in the appended drawing in which FIG. 1 is a perspective view of a tensioning device according to this invention, and in which FIG. 2 is a perspective view of the cogged belt feature of the invention.

As is noticed in this drawing, the actual surveillance tunnel is not represented, the carriage C is supported by turret T, upon which camera CA is mounted, and is represented diagrammatically in the form of a block suitable for moving over a sliding path (not represented) in a to-and-fro translational motion virtually over the entire useful length of the tunnel, and lateral ducts G1, G2, internal to the latter, are depicted for their most part by dotted lines in order to make understanding easier, these ducts being suitable for serving as slideways respectively for two tensioning pulley blocks M1, M2 for that part, internal to the tunnel, of the power-supply cable 1 and coaxial cable 2 which are connected to the camera (not represented).

In accordance with the invention, as is seen in the drawing, the power-supply and multiplexing cable 1, coming from outside the tunnel, penetrates into one of the lateral sides of the latter at a point P1 located at a distance d1 of approximately one meter taken from the median transverse axis XX of the tunnel and on the side of the half A of the length of the duct G1; conversely, the coaxial cable 2 penetrates from the other, opposite, lateral side of the tunnel at a point P2 located at a distance d2, of approximately one meter, taken from the median transverse axis XX of the tunnel and on the side of the half B of the length of the duct G2.

From its point P1 of penetration, the power-supply and multiplexing cable 1 is brought into the groove of the pulley of the pulley block M1, from which pulley it is directed toward the bracket S1 with which the carriage C is provided and, from this bracket, it is connected to the equipment casing of the camera, it being noted that the length of this cable 1 between its point P1 of penetration, where it is immobilized, and its point of arrival on the bracket S1, where it is anchored, is provided so that the carriage can be moved over the entire length of the tunnel, the pulley block M1, during one complete travel by this carriage, only having to move in the half B of the duct G1 without crossing the median transverse axis XX, when the carriage reaches the end of the half A.

As regards the coaxial cable 2, this is cabled up in a similar manner but inversely to the cable assembly of the power-supply and multiplexing cable 1, for, as is seen in the drawing, from its point of P2 penetration into the tunnel it is rigged up over the pulley of the pulley block M2 before reaching the bracket S2 with which the carriage is provided on the side away from the bracket S1, and then being connected to the equipment casing of the camera. Of course, like the power-supply cable 1, the coaxial cable 2 is immobilized at its point P2 of penetration and anchored to the bracket S2 after being passed into the pulley block M2, its length between the point P2 and the bracket S2 being identical to that of the power-supply cable 1, the pulley block M2, during one complete travel by the carriage C, having only to move in the half A of the duct G2, without crossing the median transverse axis XX when the carriage reaches the end of the half B.

In order to ensure a certain tension in the cables 1 and 2, in their reeved parts, so that they do not rub frictionally regardlessly in the ducts G1 and G2 respectively, the present invention provides a device for tensioning these cables which is constituted by a flexible cablet 3, or a drive cogged 3A as shown in FIG. 2, belt, which connects one of the pulley blocks M1 and M2 to the other, this cablet or belt, from the latter pulley block M2, being passed into the groove of a first return pulley 4 mounted in a fixed manner in the end of the half A of the duct G2, then sent back toward the end of the half B of this duct G2 where it is passed into the groove of a second return pulley 5, then, from there, this cablet is passed into the groove of a tensioning roller—forming part of a tensioning device (not represented but located at this same end of the half B), and then, from this roller 6, it is passed into the groove of a third return pulley 7 mounted in a fixed manner in the end of the half B of the duct G1 from which it is directed toward the pulley block M1 to which it is attached.

The operation of this device for balanced tension between the two cables 1 and 2 can easily be deduced from the drawing, for, when the carriage is moved in the direction of that end of the tunnel corresponding to the half A, the pulley block M1 is driven into the half B in the direction of the axis XX by the power-supply cable 1 anchored to the bracket S1; by virtue of its movement, the pulley block M1 drives, by means of the tensioning cablet 3 or cogged belt 3A, the pulley block M2 which then moves in the same direction as the carriage C and which drives the coaxial cable 2 anchored to the bracket S2. Conversely, when the carriage is moved in the direction of that end of the tunnel corresponding to the half B, the pulley block M2 is driven by the coaxial cable 2 in the direction of the axis XX in the same direction as the carriage C and, by means of the cablet 3, the pulley block M1 is also moved in this same direction and drives the power-supply and multiplexing cable 1, so that both these cables are always taut under the tension of the cablet 3 or cogged belt 3A, provided by the roller 6 of the tensioning device.

This cable assembly arrangement for tensioning the cables 1 and 2 by means of the cablet 3 or cogged belt 3A, in accordance with the invention, may provide an embodiment which is particularly suited not only for balancing the tension of these cables 1 and 2 inside the tunnel, but for constituting, at the same time, a cable assembly for translationally driving the carriage C in both directions requiring no other cable assembly for controlling the translation, as was the case, for example, in the device forming the subject of Patent Application FR-91/08151 of the applicant company. Indeed, in order to control the driving of the carriage C in both directions by means of the reeved cable assembly which has just been described, all that is required is to render driving one of the return pulleys 4, 5, 7, preferably the pulley 5 located at the end of the half B of the duct G2 and in the vicinity of the roller 6 of the tensioning device. It is easily understood that, in this case, the carriage C is driven by one or other of the cables 1 and 2, depending on the desired direction of movement, as a result of the traction exerted by the cablet 3 on one or other of the pulley blocks M1 and M2, one of which then becomes the driver pulley block and the other the driven pulley block, or vice versa.

I claim:

1. A tensioning device suitable for providing an adjustable and balanced tension to the power-supply and multiplexing cable, as well as to the coaxial video transmission cable, both connected up to a camera turret supported by a carriage for to-and-fro translation in a video surveillance tunnel, each of these two cables being anchored in a fixed manner to the carriage, as well as to its point of penetration into the tunnel coming from outside the latter, this device being one in which each of the power-supply and multiplexing and coaxial cables is rigged up over a pulley of a respective movable tensioning pulley block before being anchored to a respective bracket of the carriage, and in which the point of penetration into and of attachment in the tunnel of the power-supply and multiplexing cable is located in the median longitudinal part of this tunnel and on a lateral side of the latter corresponding to the side of the carriage where this cable is anchored, whereas the point of penetration and of attachment of the coaxial cable, as well as its point of anchoring to the carriage are located in the same manner, but on the other lateral side of this tunnel, the pulley block for tensioning this coaxial cable being located in order to move in one half of the length of the tunnel, whereas the pulley block for tensioning the power-supply and multiplexing cable is located in order to move in the other half of the length of the tunnel, these two tensioning pulley blocks being connected together via a flexible cablet or cogged belt which is permanently tensioned by means of a roller of a tensioning device.

2. The device as claimed in claim 1, wherein the flexible cablet connecting the pulley block for tensioning the power-supply and multiplexing cable to the pulley block for tensioning the coaxial cable is cabled up from this pulley block in order to pass firstly over a first return pulley, attached to the corresponding end of the tunnel in the half of the latter in which this pulley block is to move as a result of the translational motion of the carriage over the entire length of the tunnel, then this cablet or cogged belt follows the entire length of the tunnel before passing over a second return pulley attached to the other end of the tunnel and, subsequently, passes over the roller of the tensioning device, then over a third return pulley, attached to this same end of the tunnel and, finally, is attached, by its other end, to the other pulley block which is located in order to move in the corresponding other half of this tunnel.

3. The device as claimed in claim 1, wherein the power-supply and multiplexing cable penetrates into the median part of one of the lateral sides of the tunnel at a point located at a distance of approximately one meter from the median transverse axis of this tunnel, this distance being taken from this axis in the direction away from the position of the pulley block for tensioning this power-supply and multiplexing cable, the point of penetration of the coaxial cable being located in the same manner but on the opposite lateral side of the tunnel, that is to say at approximately one meter from the median transverse axis of the latter, but in the direction away from the position of the pulley block for tensioning this coaxial cable.

4. The device as claimed in claim 1, wherein ducts are installed laterally inside the tunnel, and over the entire length of the latter, so that they serve respectively as bearing slideways for the pulley blocks and, optionally, for the cables, these ducts being preferably provided made of plastic having a low coefficient of friction, such as PVC.

5. The device as claimed in claim 1, adapted for providing not only a balanced tension to the power-supply and coaxial cables during the translation of the carriage in either direction, but also for constituting a device for controlling this translation of the carriage, without requiring other cable assemblies to drive the latter, wherein one of the three return pulleys for the flexible cablet, or cogged belt, and, preferably, the second pulley located in the vicinity of the roller of the tensioning device, instead of being a driven pulley, is rotationally controlled in order to serve as a driving pulley for driving the cablet, or cogged belt, to and fro, each of the two tensioning pulley blocks then serving respectively, one as driver or traction pulley block, and the other as driven pulley block and vice versa, interacting with each of the cables in order to move the carriage translationally in either direction.

6. The device as claimed in claim 1, wherein the flexible cablet is provided, preferably, made of nylon having a low coefficient of elongation under tension.

* * * * *